Oct. 21, 1941.　　　H. E. ELLIS　　　2,259,972
SPLIT-PHASE MOTOR
Filed Jan. 31, 1940
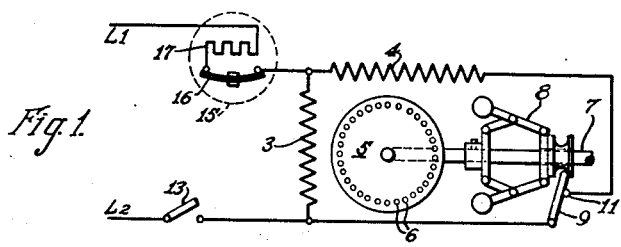
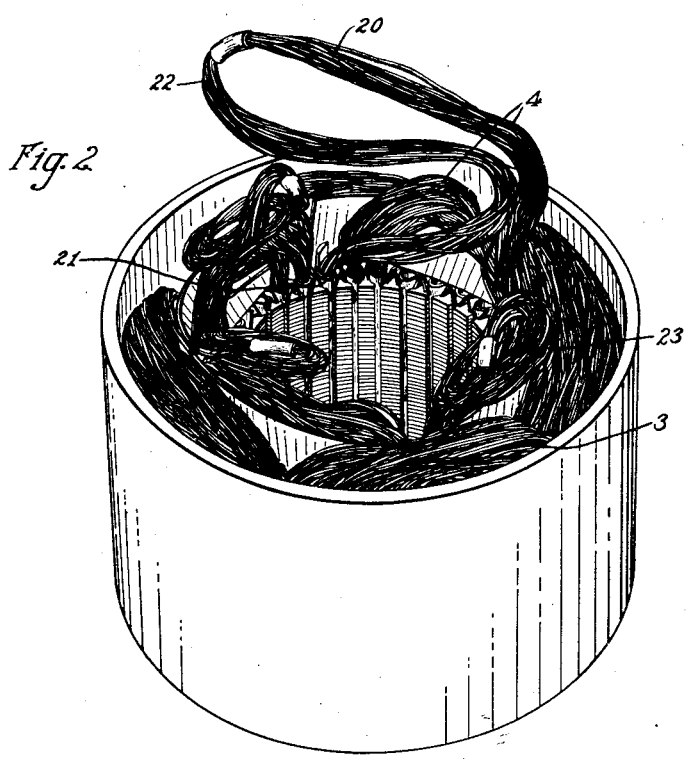
WITNESSES:
INVENTOR
*Harold E. Ellis.*
BY
ATTORNEY Patented Oct. 21, 1941

2,259,972

UNITED STATES PATENT OFFICE 2,259,972

SPLIT-PHASE MOTOR

Harold E. Ellis, Lima, Ohio, assignor to Westinghouse Electric & Manufacturing Company, East Pittsburgh, Pa., a corporation of Pennsylvania Application January 31, 1940, Serial No. 316,526

3 Claims. (Cl. 172—279)

My invention relates to self-starting single-phase induction-motors of the type commonly known as split-phase motors which start with the assistance of a temporary-duty high-resistance starting-winding, and which run on a main winding alone, with the starting-winding disconnected.

Heretofore, motors of the above-described type have been subject to a serious design-limitation in that the starting-winding should have a fairly high resistance in order to obtain a good starting-torque and also to reduce the starting-current inrush which is drawn from the line by the motor at the moment of starting, and at the same time the starting-winding should have a sufficient current-carrying capacity to enable it to remain on the line long enough for the usual motor-protecting device to operate, to disconnect the motor, in case the motor should stall without starting. These requirements are conflicting, because the high-resistance requirements frequently call for a much smaller wire than will satisfy the current-carrying requirements, which means that something has to be sacrificed, either in starting-torque, current-inrush, or ruggedness of design, particularly with respect to the ability of the starting-winding to avoid burnouts.

The particular object of my invention is to solve the above-mentioned difficulties in an extremely economical manner, without the necessity for resorting to more expensive solutions involving external resistors. The matter of cost is important because my invention has particular relation to small-size motors which are sold on a highly competitive basis, so that even a small item of cost, such as an external resistance, is a very important consideration.

A more specific object of my invention is to provide a split-phase motor in which the starting-winding is made from a wire having an adequate cross-section to satisfy the current-carrying requirements thereof, and in which the resistance is increased, without increasing the number of turns, by having the coils of the starting-winding wound as if for a larger motor than the motor to which they are applied, the extra length of the starting-winding coils being doubled back on the end-connections of the motor, either in front of, or in back of, the rest of the starting-winding end-connections, thereby providing the needed extra resistance in the most economical manner of which I have any knowledge. The folded-end-turn expedient makes a very flexible design, in which the resistance can be adjusted to a considerable nicety without requiring special wire-sizes, and without requiring special (and hence costly) wire-materials, such as aluminum or other high-resistance wires, as distinguished from the preferable use of copper wires, although I am not, of course, limited in the matter of either the wire-size or the wire-material.

With the foregoing and other objects in view, my invention consists in the combinations, systems, methods, apparatus and parts hereinafter described and claimed, and illustrated in the accompanying drawing, wherein:

Figure 1 is a diagrammatic view of circuits and apparatus illustrating the type of motor to which my invention applies; and Fig. 2 is a perspective view of the stator or primary member, showing the folded-back construction of the starting-winding end-turns, in accordance with my invention.

In Fig. 1, I illustrate my invention as being applied to a split-phase, self-starting, single-phase motor having a primary or stationary member which is provided with a main or running-winding 3 and an approximately quadrature-related starting-winding 4. The motor also has a secondary or rotating member 5 which is provided with a squirrel-cage winding 6, or other polyaxially short-circuited secondary winding. The rotor-member 5 is mounted on a shaft 7 which is provided with a centrifugal device or speed-governor 8 which actuates a start-run switch 9 which breaks a back-contact 11 to deenergize the starting-winding 4 at a predetermined percentage of the normal running-speed of the motor.

The motor is energized from a pair of line-terminals L1 and L2, as by means of a simple starting-switch 13, in such a manner that, when the starting-switch is closed, single-phase electrical energy is directly applied to the main primary winding 3, and is also temporarily applied to the starting-winding 4 in series with the centrifugal switch-means 11—9, so that the motor starts with both of the primary windings 3 and 4 energized from the single-phase supply line L1—L2, until the motor has reached a certain proportion of its final speed, at which point the centrifugal switch-blade 9 snaps open, deenergizing the starting-winding 4 and causing the motor to continue to run on the main or running-winding 3 alone. It is to be understood that the speed-responsive switch 9 is to be considered as representative of any start-run switch-device which is responsive to a function of the motor-speed.

Motors of the class described are commonly provided with some sort of overload protective device, the most satisfactory form of which is illustrated in Fig. 1, as comprising a thermal protective device 15 comprising a bimetallic switching member or disk 16 and a heating-resistor 17 intimately associated with the bimetallic switching-member 16. The thermal protective device 15 is disposed, as intimated in the drawing, in close relation to the motor, so that it is directly heated by the motor in case the motor should become overheated, the protective device being commonly mounted upon the stator or primary member of the motor. In addition to the direct heat-transfer relation to the motor, the thermal protective device 15 is also supplied with a current-responsive heating-means of its own, by having its bimetallic switching-element 16 and its electrical heater 17 connected in series with each other and in series with one of the supply-lines Ll', so that the thermal protective device is responsive to the current supplied to the motor. The adjustment of the thermal protective device is such that the motor will start in a normal manner without heating the thermal contact-member 16 to the point where the contacts will be opened, but if the motor should become stalled or overloaded the thermal contact-device 16 will open in time to protect the motor against burnout.

In order for the motor to start, it is necessary for the current in the quadrature-related starting-winding to be out of phase with the current in the main winding 3. In the particular type of motor to which my invention relates, the starting-winding 4 is of the resistance-start split-phase type, in which the starting-winding is designed so as to have a higher ratio of resistance to inductance than the main winding 3. In accordance with my present invention, this higher ratio of resistance to inductance, in the starting-winding 4, is obtained by increasing the length of the coils 20 of the starting-winding 4, just as if the starting-winding were made for a larger stator-member than the motor to which the starting-winding is applied. In other words, the coils 20 of the starting-winding 4 are longer than is necessary to lie in the proper slots 21 of the stator-member, and to span the necessary end-connections between the proper slots at the respective ends of the motor, so that an additional loop-length 22 is obtained, at at least one end of the motor, which additional loop-length is suitably folded back on itself, as indicated at 23, so as to overlie (or underlie) the end-connections of the motor, the same being suitably secured, the same as any other end-connections of the motor.

It will be readily apparent that my looped end-connections 22—23 provide an extremely simple, rugged, and inexpensive method of increasing the resistance of the starting-winding without decreasing the current-carrying capacity thereof. In the normal design of a motor made in accordance with my invention, I prefer to choose a size of wire which is just sufficient to carry the required starting-winding current for the required length of time, and I then make the length of the wire sufficient to obtain the required starting-resistance, dividing this length into the proper number of turns, for the starting-winding, so that all of the turns shall be loops of approximately the same length, the extra length being taken up by folding back the extra portion of the end-connections as previously described. I prefer to utilize copper, for the material of the wire, because copper wire is commercially available in standard sizes of the required gradations, and because it is at present less expensive than other forms of wires, so that it is more economical, in general, to obtain the extra resistivity by using a longer length of copper wire than by resorting to wire of another material, such as aluminum, having a higher resistivity than copper. It will be readily understood, however, that my invention is not limited to copper wire.

From the foregoing description, it will be understood that I obtain the benefits of a high-resistance starting-winding, with better starting-torque, and a lower line-current at starting, in a manner which is extremely economical, and which offers practically unlimited flexibility in the sense that the designer can readily obtain any required resistance, or any desired length of time that the starting-winding may have to be left on the line without burning out.

While I have illustrated my invention in an exemplary form of embodiment, it is obvious that many changes and substitutions may be made by the skilled workers of the art, without departing from the essential spirit of my invention, particularly in its broader aspects. I desire, therefore, that the appended claims shall be accorded the broadest construction consistent with their language and the prior art.

I claim as my invention:

1. A self-starting single-phase induction-motor comprising relatively rotating primary and secondary members, the primary member having a main winding and an approximately quadrature-related starting-winding, starting-connection means for energizing both the main and starting-windings from a common pair of single-phase supply-leads, and start-run switching means operable to deenergize the starting-winding after the motor has started, said starting winding being characterized by having coils wound in sufficiently large loops to have extra loop-lengths doubled back on themselves with the end-connections of the motor, whereby the starting-winding may be caused to have an increased resistance relative to its inductance without excessive reduction in the cross-section and current-carrying capacity of the starting-winding.

2. The invention as defined in claim 1, characterized by said start-run switching-means being responsive to a function of the motor-speed.

3. The invention as defined in claim 1, in combination with a thermally responsive protective switching-means disposed in direct heat-transfer relation to the motor and also having heating-means of its own, for electrically heating the same in response to a current in the motor, the starting-winding being of sufficiently large wire to stand remaining connected for the time required to actuate said protective means.

HAROLD E. ELLIS.